United States Patent
Shimizu

(10) Patent No.: US 6,201,529 B1
(45) Date of Patent: *Mar. 13, 2001

(54) LIQUID CRYSTAL DISPLAY APPARATUS AND METHOD OF DRIVING THE SAME

(75) Inventor: Masayuki Shimizu, Hamura (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/692,493

(22) Filed: Aug. 6, 1996

(30) Foreign Application Priority Data

Aug. 8, 1995 (JP) ................................................... 7-224732
Oct. 5, 1995 (JP) ................................................... 7-286646

(51) Int. Cl.$^7$ ................................................... G09G 5/02
(52) U.S. Cl. ........................... 345/150; 345/33; 345/34; 345/116; 345/141; 345/186; 345/194; 345/509; 345/517
(58) Field of Search ........................... 345/88, 89, 148, 345/150, 153, 186, 199, 192, 193, 194, 508, 33, 38, 50–55, 72, 83, 155, 87, 509, 34, 116, 141, 516, 517

(56) References Cited

U.S. PATENT DOCUMENTS

| | | | |
|---|---|---|---|
| 4,692,760 | * | 9/1987 | Unno et al. ........................... 345/30 |
| 4,789,855 | * | 12/1988 | Ozeki ........................... 340/703 |
| 4,837,564 | * | 6/1989 | Ogawa et al. ........................... 340/750 |
| 4,839,636 | * | 6/1989 | Zeiss ........................... 340/752 |
| 5,001,468 | | 3/1991 | Brice et al. ........................... 359/64 |
| 5,122,784 | * | 6/1992 | Canova ........................... 345/155 |
| 5,125,078 | * | 6/1992 | Matsuda et al. ........................... 345/56 |
| 5,191,454 | | 3/1993 | Iijima et al. ........................... 359/64 |
| 5,218,399 | * | 6/1993 | Izumi et al. ........................... 396/292 |
| 5,294,918 | * | 3/1994 | Preston et al. ........................... 345/155 |
| 5,473,341 | * | 12/1995 | Tomiyasu ........................... 345/113 |
| 5,585,950 | * | 12/1996 | Nishino et al. ........................... 349/118 |
| 5,742,271 | * | 4/1998 | Imamura et al. ........................... 345/116 |

FOREIGN PATENT DOCUMENTS

| | | |
|---|---|---|
| 3921837 A1 | 2/1990 | (DE) . |
| 0306403 A1 | 3/1989 | (EP) . |
| 2568396 | 1/1986 | (FR) . |
| 7-160231 | 6/1995 | (JP) . |
| WO 88/02162 | 3/1988 | (WO) . |

* cited by examiner

Primary Examiner—Richard A. Hjerpe
Assistant Examiner—Henry N. Tran
(74) Attorney, Agent, or Firm—Frishauf, Holtz, Goodman, Langer & Chick, P.C.

(57) ABSTRACT

An electrically controlled birifringence type liquid crystal display panel has a pictograph (picto) display area and character display areas. Character codes are stored in a DDRAM and color attribute data indicating the display colors of characters are stored in a CCRAM, both in one-to-one association with the character display areas. Character patterns for character codes stored in the DDRAM are read from a character generator, and, simultaneously color attribute data in the CCRAM is read out. A segment driver performs PWM (Pulse Width Modulation) control on voltages to be applied to electrodes of the liquid crystal display panel based on the character patten and the color attribute data, for displaying the characters in arbitrary colors. Color attribute data which specifies the display color of each of pixels constituting a pictograph is set in a picto RAM. The color attribute data of the individual segments are read from the picto RAM at the timing for displaying a pictograph, and the segment driver performs PWM control on voltages to be applied to the electrodes in accordance with this color attribute data, for displaying pictograph on the pictograph display area. It is therefore possible to display images on the plurality of display areas by specifying display colors of the individual display areas by different color designation methods.

6 Claims, 15 Drawing Sheets

| COLOR | COLOR ATTRIBUTE DATA (CCRAM) | PALETTE | PALETTE DATA | | | | DISPLAY COLOR CODE |
|---|---|---|---|---|---|---|---|
| | | | D3 | D2 | D1 | D0 | |
| BACKGROUND COLOR | 0 0 | A | 0 | 0 | 0 | 0 | 0 |
| RED | 0 1 | B | 0 | 1 | 1 | 0 | 6 |
| BLUE | 1 0 | C | 1 | 0 | 1 | 1 | 11 |
| GREEN | 1 1 | D | 1 | 1 | 1 | 1 | 15 |

FIG.10

**COLOR WEIGHT "1"
(ADDRESS 00)**

| D5 | D4 | D3 | D2 | D1 | D0 |
|---|---|---|---|---|---|
| | | PICTO RAM DATA | | | |
| 1 | 0 | 0 | 0 | 1 | 0 |
| 1 | 0 | 0 | 1 | 0 | 0 |
| 1 | 0 | 1 | 0 | 0 | 0 |
| 0 | 1 | 0 | 0 | 0 | 0 |
| 1 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

INDIVIDUAL DOTS ARE USED AS PAIRS

INDIVIDUAL BITS AT ADDRESS 00 CORRESPOND IN 1 TO 1 TO THOSE AT ADDRESS 01

**COLOR WEIGHT "2"
(ADDRESS 01)**

| D5 | D4 | D3 | D2 | D1 | D0 |
|---|---|---|---|---|---|
| | | PICTO RAM DATA | | | |
| 0 | 0 | 0 | 0 | 1 | 0 |
| 0 | 0 | 0 | 1 | 0 | 0 |
| 0 | 0 | 1 | 0 | 0 | 0 |
| 0 | 1 | 0 | 1 | 0 | 0 |
| 1 | 0 | 1 | 1 | 0 | 0 |
| 0 | 1 | 0 | 1 | 0 | 0 |
| 0 | 1 | 1 | 1 | 0 | 0 |
| 0 | 0 | 0 | 1 | 0 | 0 |

LIQUID CRYSTAL DISPLAY APPARATUS AND METHOD OF DRIVING THE SAME

BACKGROUND OF THE INVENTION

1. Field of the Invention

The present invention relates to a liquid crystal display apparatus and a method of driving the same, and, more particularly, to a liquid crystal display apparatus which displays color images using the birifringence of a liquid crystal.

2. Description of the Related Art

A liquid crystal display (LCD) panel for a color LCD apparatus generally has a liquid crystal (LC) cell, a pair of polarization plates sandwiching the LC cell, and a back light (illumination light source) located outside one of the polarization plates. The LC cell comprises a pair of transparent substrates with transparent electrodes formed on the opposing surfaces of the transparent substrates, and a liquid crystal sandwiched between the transparent substrates. One of the transparent substrates is provided with a color filter.

Conventional LCD apparatuses are driven by enabling or disabling the drive voltage to be applied between the opposing transparent electrodes to control the alignment state of the liquid crystal and causing the light from the back light to transmit or not to transmit through the LCD panel. When passing the color filter, the light from the back light is colored to the color of that color filter, thereby displaying a color image.

The light transmittance of the color filter is low, so that the conventional color LCD apparatus suffers a large light loss at the color filter, making the display darker.

In a reflection type LCD apparatus which employs a reflector in place of the back light, in particular, the incident light is absorbed by the color filter twice, before and after it is reflected at the reflector. This absorption darkens the display. It is therefore difficult to employ a color-filter using a color LCD panel in the reflection type LCD apparatus.

Under these circumstances, there has recent been developed an electrically controlled birifringence (ECB) type LCD apparatus which can display color images without using any color filter.

Since this ECB type LCD apparatus employs a different coloring method from that of the LCD apparatuses using a color filter, it cannot be driven directly by using an RGB signal which is used to drive an ordinary color LCD device using a color filter. Accordingly, the conventional ECB type LCD apparatus disregards color information and uses luminance information to provide the two-color (ON and OFF) display.

As another possible approach, the applied voltage may be altered in accordance with a display color which is specified by an RGB signal. This method, however, requires a process of temporarily developing a display image in a frame buffer and then changing the applied voltage according to the display color. This method therefore needs a relatively large-capacity frame buffer and involves complex data processing.

SUMMARY OF THE INVENTION

It is an object of the present invention to provide a liquid crystal display apparatus and a method of driving the same which accomplish multi-color display without a color filter.

It is another object of the present invention to provide a liquid crystal display apparatus and a method of driving the same by which display color is selectable pixel by pixel in the liquid crystal display apparatus.

It is further object of the present invention to provide a liquid crystal display apparatus and a method of driving the same which accomplish gradation (color) display without a large frame buffer.

To achieve the above objects, a liquid crystal display apparatus according to a first aspect of the present invention is a liquid crystal display apparatus for displaying different colors in accordance with an applied voltage which changes a liquid crystal retardation, said apparatus comprising:

a first display area having a display area of m-rows and n-columns for displaying a plurality of characters formed with a plurality of dot-shaped segments;

a second display area for displaying an image formed with a plurality of arbitrarily-shaped segments; and drive means for specifying display positions, character type and character colors with respect, to the first display area, and for specifying display colors of each arbitrarily-shaped segment with respect to the second display area.

Said drive means comprises:

character code storage means, comprising a character code memory having a memory-area of m-rows and n-columns corresponding to said first display area, for storing character codes in association with the display positions of said characters on said first display area;

character color data storage means, comprising a character color data memory having a memory area of m-rows and n-columns, for storing display color data of characters in association with an address of each character code stored in said character code storage means;

display color designation means for displaying each character on said first display area in a color corresponding to the stored display color data;

image color data storage means, comprising an image color memory whose memory bits correspond to bits representing the arbitrarily-shaped segments and image color data of the image to be formed, for storing image color data corresponding to each segment to be displayed on said second display area; and image color designation means for displaying each segment on said second display area in a color corresponding to the stored image color data.

Said image color data storage means stores each bits of said image color data: (i) at relatively same positions in adjoining memory areas of said image color memory, or (ii) in adjoining positions in a memory area of said image color memory after dividing said image color data.

At least one of said character color data storage means and said image color data storage means stores p-bit display color data for designating any of $2^p$ colors, where p is a positive integer; and said display color designation means and said image color designation means convert said p-bit display color data into q-bit display color data where q is a positive integer having a value representing an effective value of the applied voltage necessary for the display color designated by said p-bit display color data, and comprise drive pulse width setting means for setting a pulse width of a drive voltage to be applied to the liquid crystal based on said q-bit display color data.

To further achieve the above objects, a method of driving a liquid crystal display apparatus according to a second aspect of the present invention is a method of driving a liquid crystal display apparatus for displaying different colors in accordance with applied voltages which change a liquid crystal retardation, said liquid crystal display apparatus including a first display area having a display area of m-rows and n-columns for displaying a plurality of characters formed with a plurality of dot-shaped segments, and a second display area for displaying an image formed with a plurality of arbitrarily-shaped segment, said method comprising the steps of:

designating an address in a character code memory having a memory area of m-rows and n-columns corresponding to display position of a character on the first display area;

storing character code data of said character at said designated address in said character code memory with respect to the first display area;

storing display color attribute data of the character in a display color data memory having a memory area of m-rows and n-columns in accordance with the address of the character code stored in said character code memory with respect to the first display area;

storing image color attribute data corresponding to each segment in an image color memory whose memory bits correspond to bits representing arbitrarily-shaped segments and image color data of an image with respect to the second display areas; and generating segment drive signals in accordance with each stored color attribute data with respect to the first and second display areas.

Said step of storing image color attribute data comprises storing each bit of said image color attribute data: (i) in bits at relatively same positions in adjoining memory areas of said image color memory, or (ii) in adjoining bits in an adjoining memory area of said image color memory after dividing said image color attribute data.

At least one of said step of storing display color attribute data and said step of storing step of image color attribute data comprises a p-bit display color data storage step of designating any one of $2^p$ colors; and said step of generating segment drive signals comprises the steps of converting said p-bit display color data into q-bit display color data where q is greater than p having a value representing an effective value of the applied voltage necessary for the display color designated by said p-bit display color data, and of setting a pulse width of a drive voltage to be applied to the liquid crystal based on said q-bit display color data.

BRIEF DESCRIPTION OF THE DRAWINGS

FIG. 10 is a diagram illustrating the correlation between gradation data and the contents of palettes A, B, C and D;

FIG. 12 is a diagram showing an example in which gradation data in the picto display data in FIG. 11 is set by a pair of data at the adjoining addresses;

Figure 13:
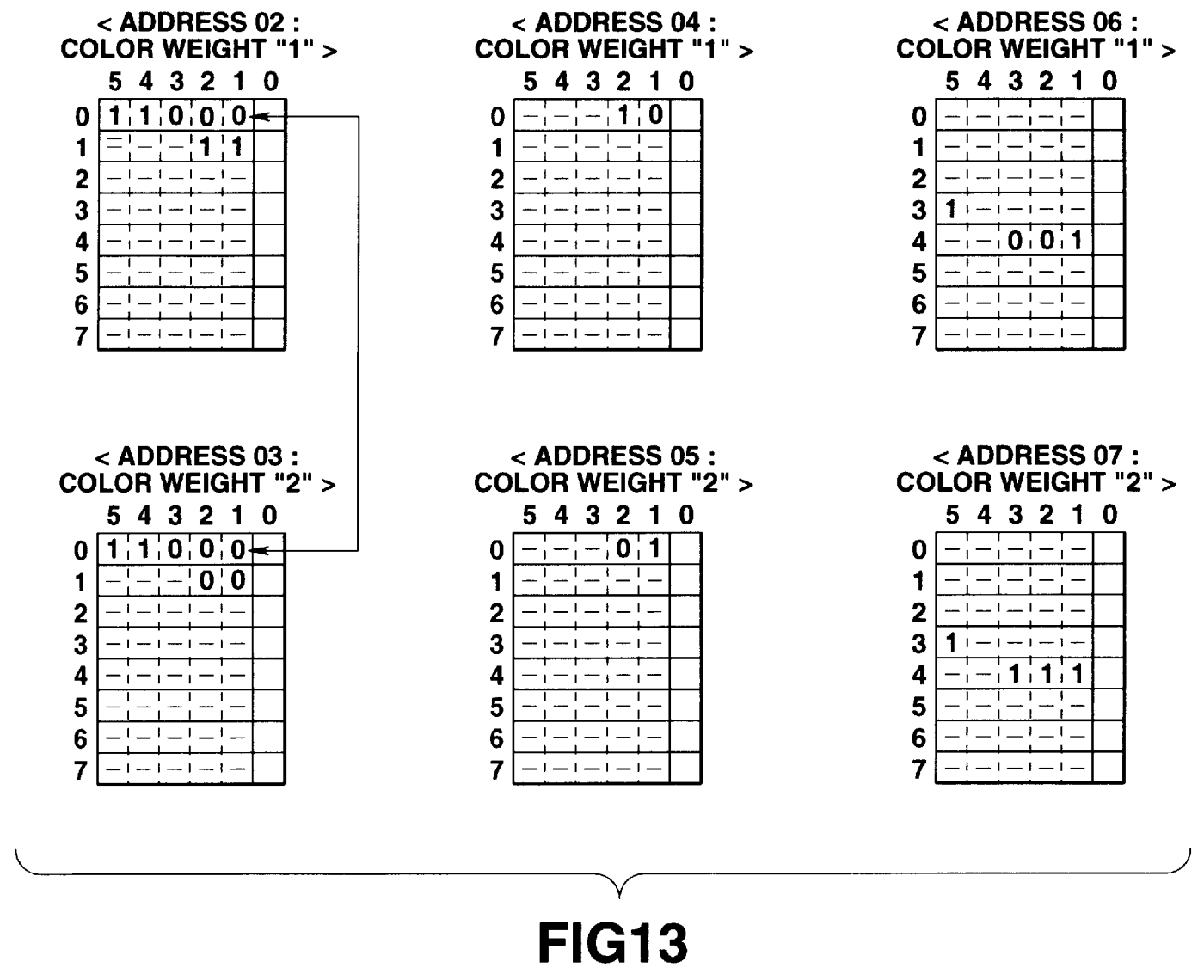

FIG. 13 is a diagram exemplifying the setting of gradation data in the picto RAM by a pair of data at the adjoining addresses;

DETAILED DESCRIPTION OF THE PREFERRED EMBODIMENT

A preferred embodiment of the present invention will now be described referring to the accompanying drawings.

Figure 1:
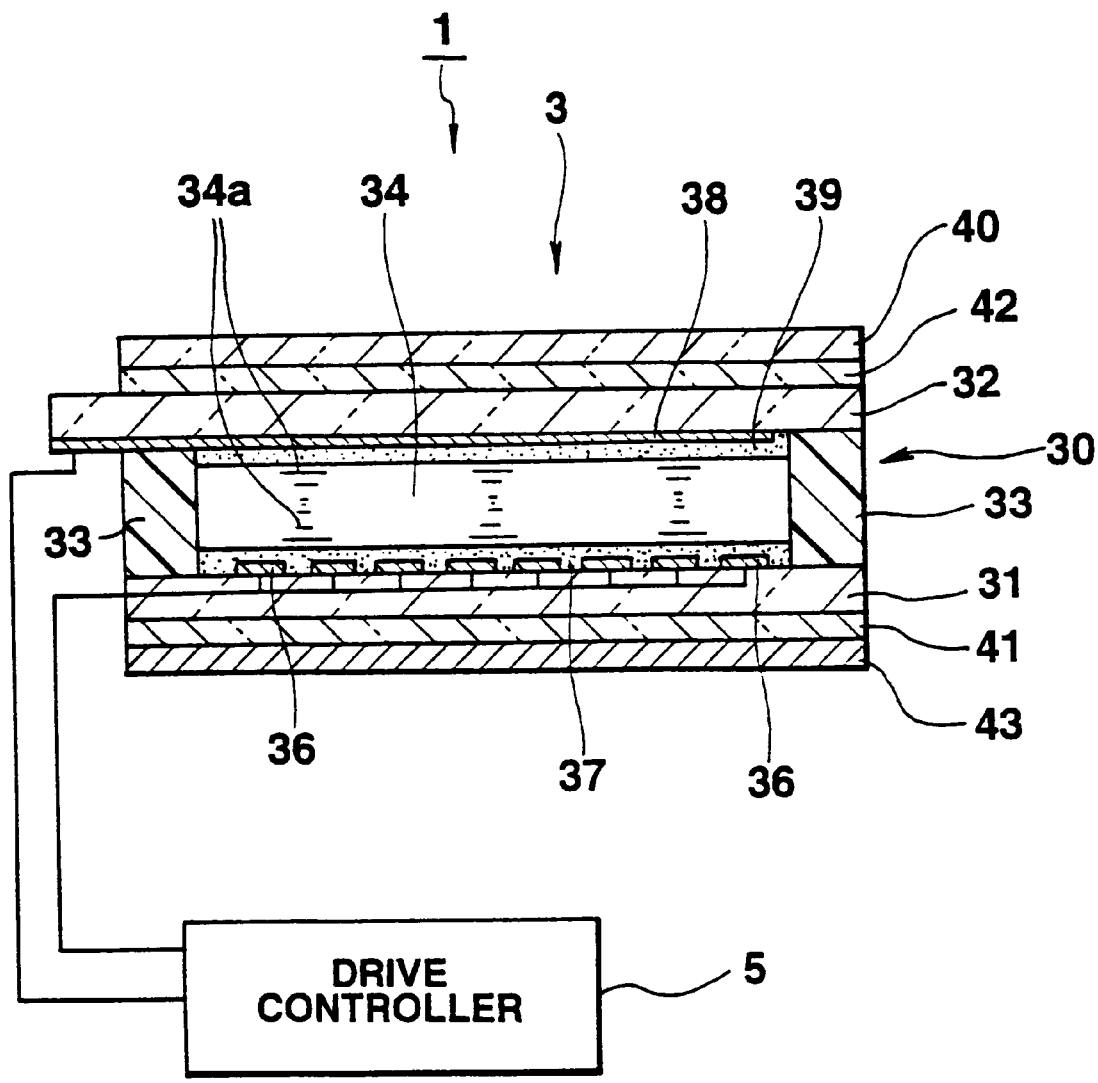
FIG. 1 is a cross-sectional view of an LCD panel of a color LCD apparatus according to one embodiment of this invention.

FIG. 1 presents a cross-sectional view of an LCD (Liquid Crystal Display) panel of a color LCD apparatus according to one embodiment of this invention.

As shown in FIG. 1, a color LCD apparatus 1 comprises an LCD panel 3 and a drive controller 5 which drives the LCD panel 3. The drive controller 5 controls the value of the drive voltage to be applied to the LCD panel 3 to display images in different colors in accordance with the value of the drive voltage.

The LCD panel 3, which is a reflection type, has an LC (Liquid Crystal) cell 30, upper and lower polarization plates 40 and 41 sandwiching the LC cell 30, a retardation plate 42 located between the LC cell 30 and the upper polarization plate 40, and a reflector 43 provided on the bottom of the lower polarization plate 41 (at the back of the LCD panel 3).

The LC cell 30 has a pair of transparent substrates 31 and 32 connected via a seal member 33, and a liquid crystal 34 sealed in the area defined by those substrates 31 and 32. Respectively formed on the opposing surfaces of the transparent substrates 31 and 32 are 72 transparent electrodes (segment electrodes) 36 and 40 transparent electrodes (common electrodes) 38. Aligning films 37 and 39 are respectively formed on the transparent electrodes 36 and 38.

The aligning films 37 and 39, whose surfaces have undergone an aligning treatment like rubbing, restrict the aligning direction of the nearby LC molecules so that the lengthwise directions of the LC molecules are aligned to the direction of the aligning treatment. Accordingly, the LC molecules 34a of the liquid crystal layer 34 are twisted toward the transparent substrate 32 from the transparent substrate 31 at an angle of 180 to 270 degrees. That is, the LC cell 30 is a super twisted nematic (STN) LC cell.

The retardation plate 42 causes the linearly polarized light having passed the upper polarization plate 40 to be elliptically polarized. The retardation plate 42 has its optical axis (phase-leading axis or phase-lagging axis) obliquely shifted from the transmission axis, 40a, of the upper polarization plate 40 by a predetermined angle.

Figure 2:
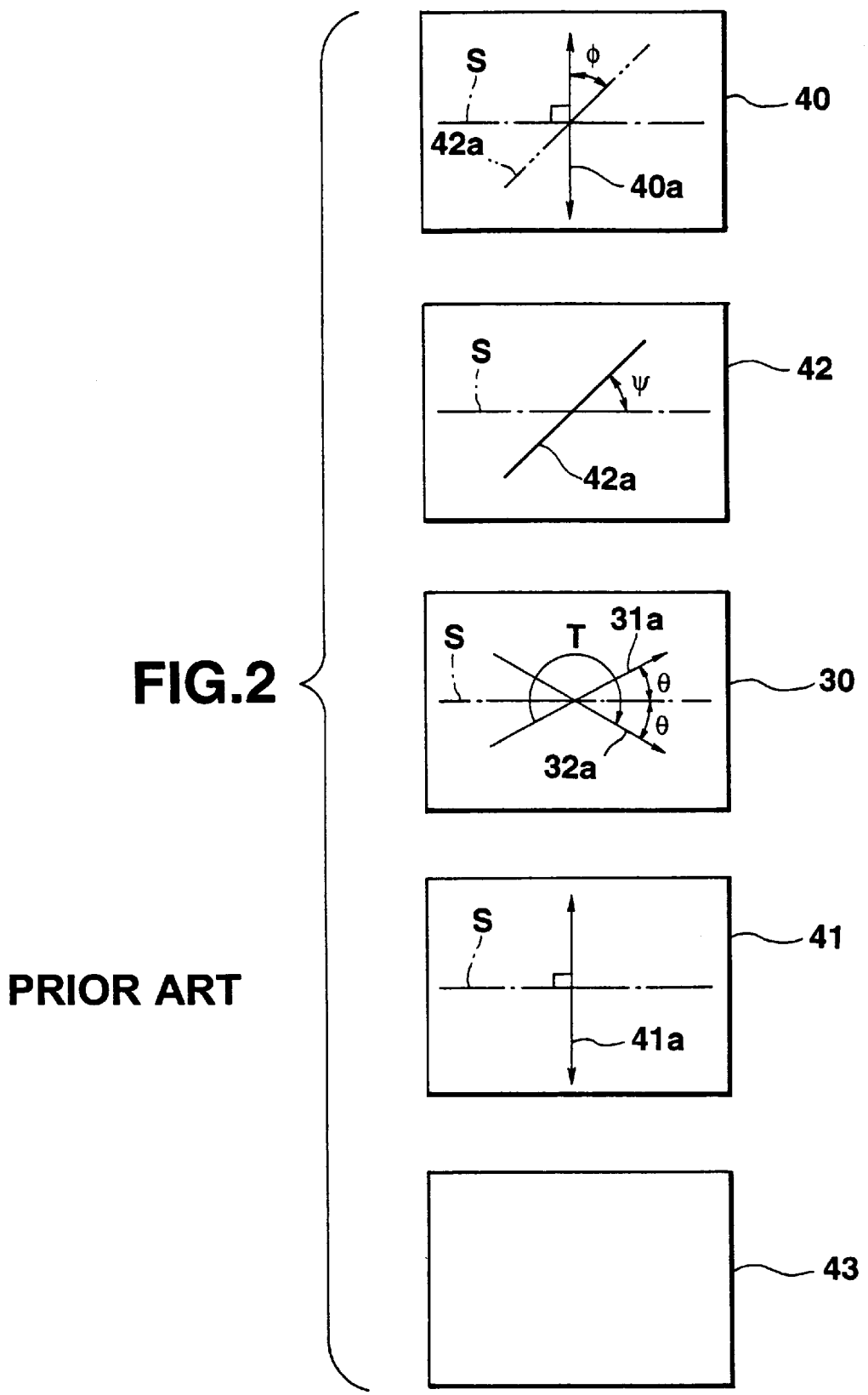
FIG. 2 is an exemplary plan view exemplifying the combination of the direction of the aligning treatment performed on an aligning film in the LCD panel according to this embodiment, the optical axis of a retardation plate and the transmission axis of a polarization plate for each constituting element.

FIG. 2 is an exemplary plan view exemplifying the combination of the direction of the aligning treatment performed on the aligning film in the LCD panel according to this embodiment, the optical axis of the retardation plate and the transmission axis of the polarization plate for each constituting element.

In the diagram, single-arrowhead lines 31a and 32a indicate directions of the aligning treatment performed on the aligning films 37 and 39, respectively. Double-arrowhead lines 40a and 41a respectively indicate the transmission axes of the upper polarization plate 40 and the lower polarization plate 41. A line 42a shows the optical axis of the retardation plate 42. A line S indicates a reference line which is introduced for the sake of descriptive convenience and extends horizontally.

As shown in FIG. 2, the aligning treatment directions 31a and 32a are set to be inclined in the opposite directions to the reference line S by a predetermined angle $\phi$. Accordingly, the LC molecules 34a (FIG. 1) are twisted toward the upper transparent substrate 32 from the lower transparent substrate 31 in the direction and angle indicated by the arrow T.

The optical axis 42a of the retardation plate 42, which is, for example, the phase-lagging axis, obliquely intersects the reference line S by a predetermined inclination angle $\psi$. The transmission axes 40a and 41a, which are parallel to each other, are inclined to the optical axis 42a by an inclination angle $\phi$.

The following will describe why a display image on the LCD panel 3 is colored.

As external light passes the upper polarization plate 40, it is linearly polarized. As the linearly polarized light passes the retardation plate 42, it becomes elliptically polarized by the birifringence effect according to the optical layout condition, such as the position of the retardation plate 42, and the value of the retardation. As this elliptically polarized light passes the LC cell 30, it changes the polarized state by the birifringence effect according to the optical layout condition of the LC cell 30 and the retardation value.

When the elliptically polarized light, which has undergone the birifringence effect caused by the retardation plate 42 and the LC cell 30, hits the lower polarization plate 41, only the wavelength component of the elliptically polarized light which is parallel to the transmission axis 41a passes the lower polarization plate 41. Therefore, the light (linearly polarized light) which goes out from the lower polarization plate 41 becomes colored. The hue is essentially determined by the retardation of the retardation plate 42 and the retardation of the LC cell 30.

The light having passed the lower polarization plate 41 is reflected by the reflector 43 and goes to the upper side of the LCD panel 3 in the opposite path to the above-described light path. The color of the outgoing light presents color display.

The retardation of the retardation plate 42 is determined by the product, $\Delta n \cdot d$, of the refractive anisotropy $\Delta n$ and the plate thickness d of the retardation plate 42. The retardation of the LC cell 30 is determined by the product, $\Delta n \cdot d$, of the refractive anisotropy $\Delta n$ and the layer thickness d of the liquid crystal layer 34 and the alignment state of the LC molecules 34a. By changing the value of the voltage to be applied to the LC cell 30 to alter the alignment state of the LC molecules 34a, therefore, the retardation of the LC cell 30 changes and the degree of the birifringence effect of the LC cell 30 changes.

The above will be described more specifically. When no voltage is applied to the LC cell 30, the light incident to the LCD panel 3 undergoes the birifringence effect of the retardation plate 42 and the birifringence effect according to the initial twist angle T of the LC molecules 34a and becomes elliptically polarized light according to those birifringence effects. This elliptically polarized light passes the lower polarization plate 41 and is reflected by the reflector 43, and the reflected light travels in the opposite path to go out to the upper side of the LCD panel 3. The display color then becomes the color according to the retardation of the retardation plate 42 and the retardation of the liquid crystal layer 34 aligned at the initial twist angle T.

When a voltage is applied to the transparent electrodes 36 and 38, the LC molecules 34a gradually go upright from the initial twisted state as the voltage value increases. In accordance with the aligning state of the LC molecules 34a which have been aligned upright, the retardation of the LC cell 30 changes. The light incident to the LCD panel 3 undergoes the birifringence effect of the retardation plate 42 and the birifringence effect according to the varied retardation of the LC cell 30 and becomes elliptically polarized light according to those birifringence effects. The display color then differs from the one acquired in the above case where no voltage is applied to the LC cell 30.

When a voltage large enough to align the LC molecules 34a substantially upright is applied to the LC cell 30, the retardation of the LC cell 30 becomes approximately "0." Consequently, the birifringence effect of the LC cell 30 vanishes and the light incident to the LCD panel 3 is elliptically polarized only by the birifringence effect of the retardation plate 42. This elliptically polarized light then passes the lower polarization plate 41, is reflected by the reflector 43, and travels in the opposite path to leave the LCD panel 3. The outgoing light is colored with the color according to the retardation of the retardation plate 42.

The display area of the LCD panel 3 will now be discussed.

The LCD panel 3 has 34 common electrodes 38 and 72 segment electrodes 36 as mentioned earlier, and has a plurality of pixels defined by the opposing portions of the common electrodes 38 and the segment electrodes 36.

Figure 3:
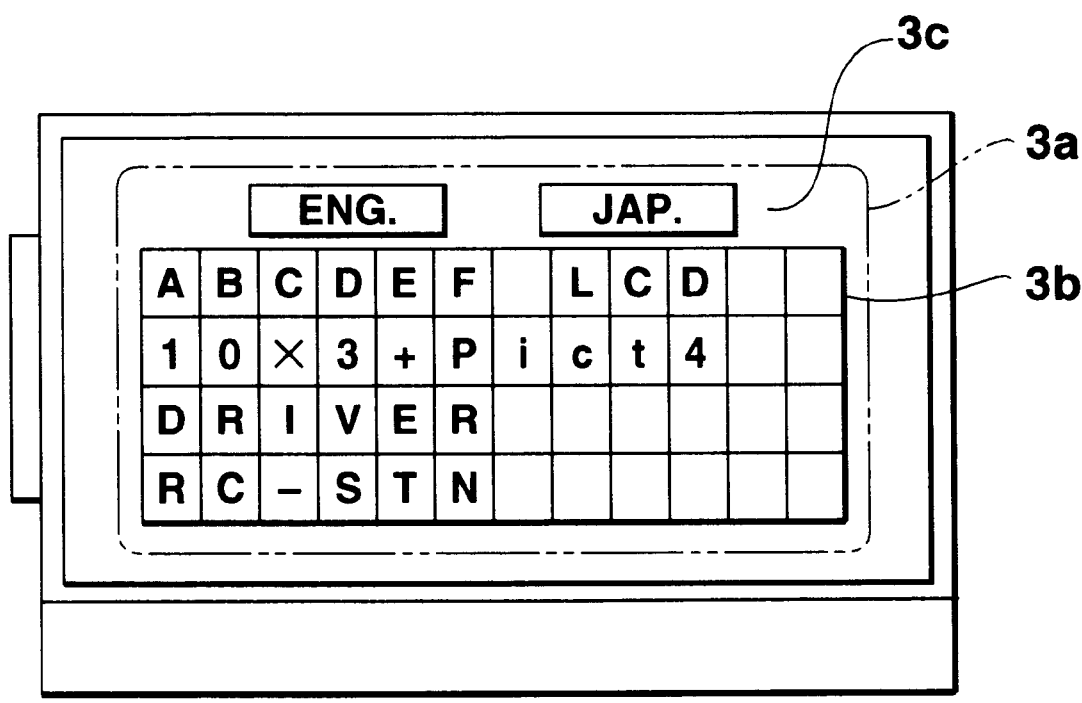
FIG. 3 is a diagram showing the display area of the LCD panel according to this embodiment.

As shown in FIG. 3, the upper area of a display area 3a of the LCD panel 3 constitutes a pictograph (hereinafter referred to as "picto") display area 3c, and the lower area constitutes a segment display area (character display areas) 3b.

The individual pixels of the segment display area 3b are shaped like dots. The segment display area 3b has a dot pattern of 72 dots ×32 dots by which it displays arbitrary characters (including numerals and symbols). The display positions and sizes of characters are fixed, and there are 4 lines by 12 digits of character display areas each having a size of 8×6 dots.

The individual pixels of the picto display area 3c are patterned in arbitrary shapes to form predetermined images. In FIG. 3, the display patterns are "Eng.", "Jap." and the frames surrounding the former two. Of the 72 segment electrodes 36, predetermined three segment electrodes 36 are patterned in those shapes. The first common electrode 38 faces the frame patterns and the second common electrode 38 faces the "Eng." and "Jap.".

The drive controller 5 performs the matrix driving of the entire common electrodes 38 and segment electrodes 36, i.e., the entire display area 3a, to display an image.

The drive controller 5 will now be described.

Figure 4:
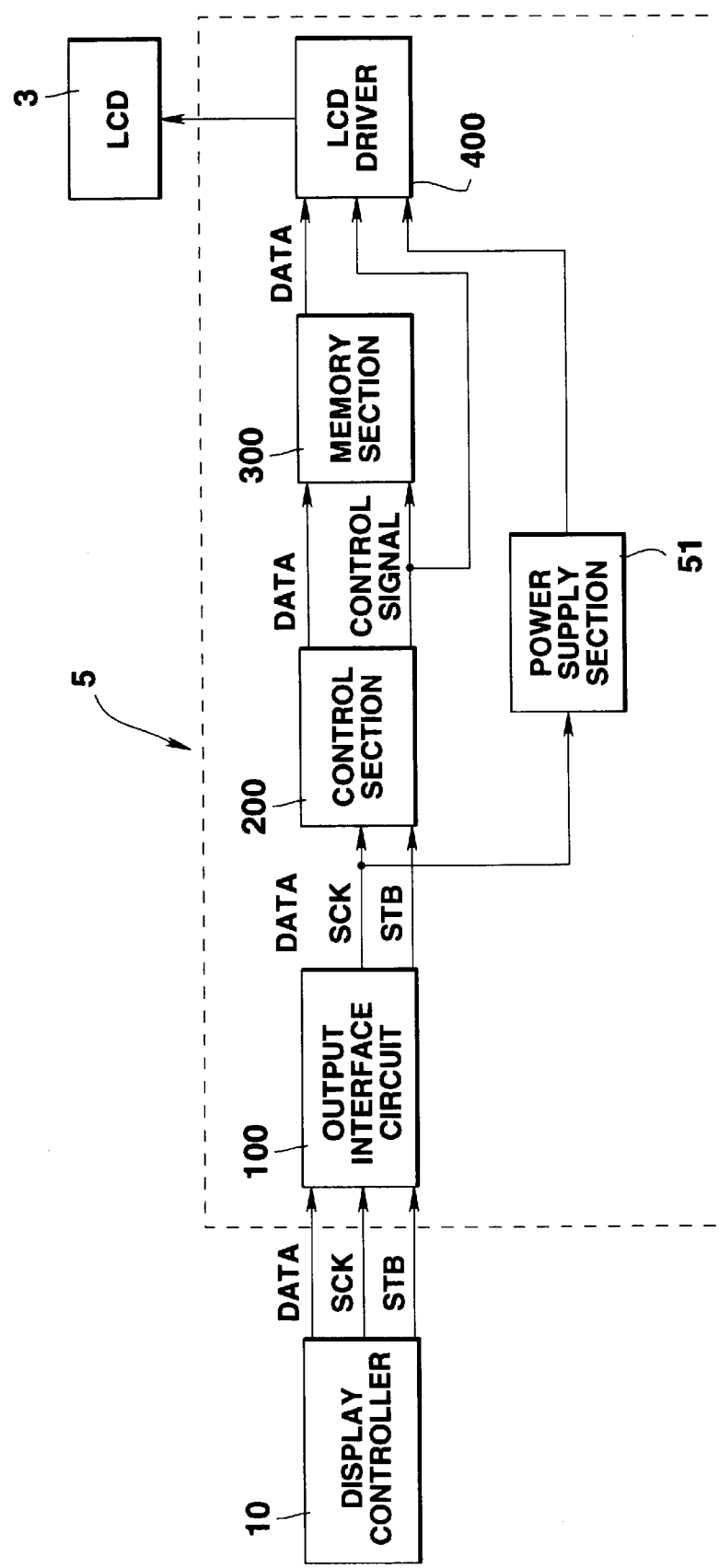
FIG. 4 is a block diagram showing the general structure of the color LCD apparatus according to this embodiment.

FIG. 4 presents a block diagram showing the overall circuit structure of the color LCD apparatus 1 according to this embodiment.

The drive controller 5 is connected between the LCD panel 3 and a display controller 10 which performs data processing to produce display data. The drive controller 5 produces an LC drive voltage (which will be discussed later) according to a display color in accordance with serial input data DATA, a serial interface shift clock signal SCK and a serial interface input enable signal STB, all input from the display controller 10. The drive controller 5 applies the LC drive voltage to the LCD panel 3 to display characters in multiple colors.

The drive controller 5 comprises a power supply section 51, an output interface circuit 100, a control section 200, a memory section 300 and an LCD driver 400, as shown in FIG. 4.

Figure 5:
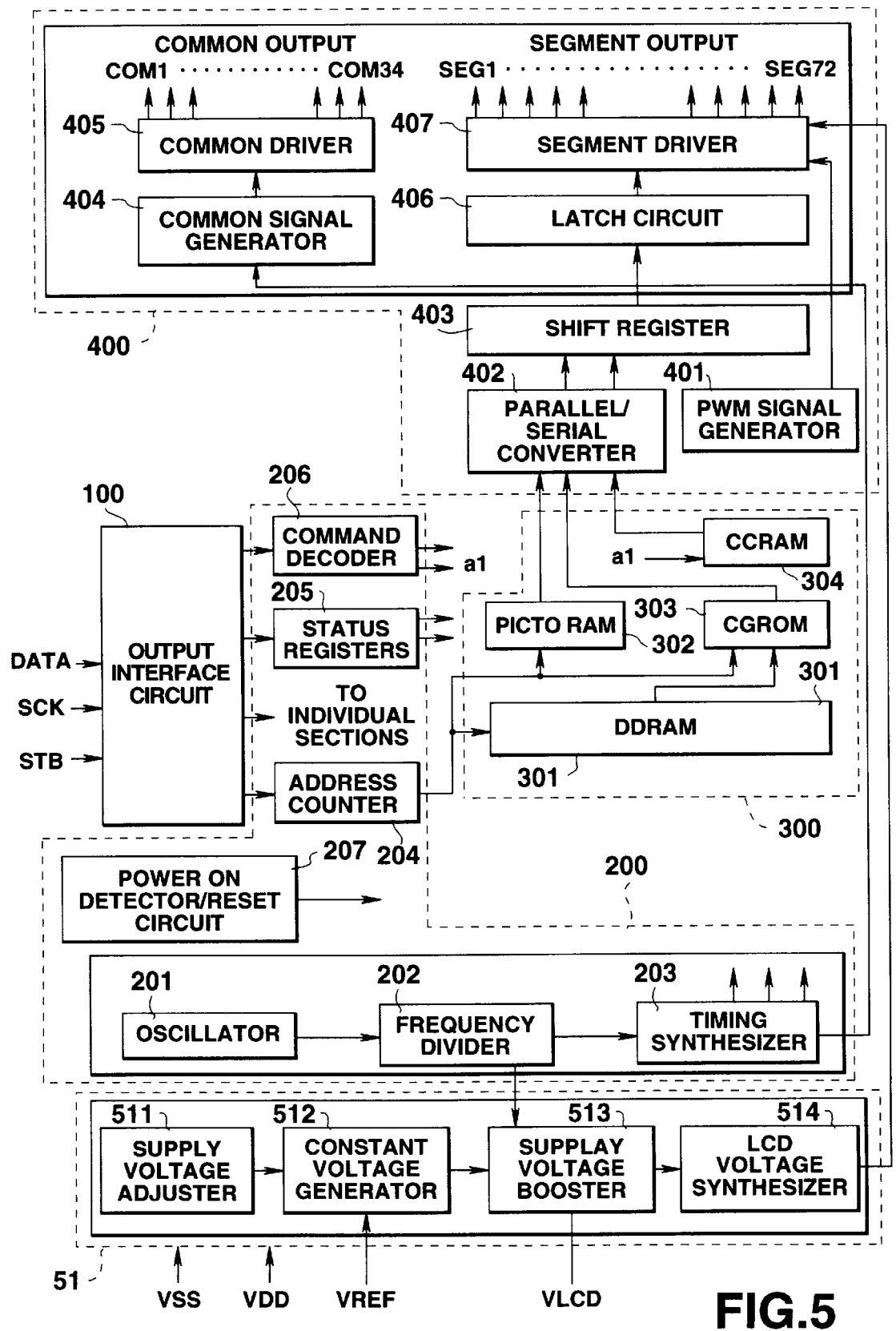
FIG. 5 is a block diagram showing the detailed structure of a drive controller according to this embodiment.

FIG. 5 is a block diagram showing the detailed structure of the drive controller 5.

As shown in FIG. 5, the power supply section 51 includes a supply voltage adjuster 511, a constant voltage generator 512, a supply voltage booster 513 and an LCD voltage synthesizer 514.

The control section 200 includes an oscillator 201, a frequency divider 202, a timing synthesizer 203, an address counter 204, a plurality of status registers 205, a command decoder 206 and a power ON detector/reset circuit 207.

The memory section 300 includes a display data RAM (DDRAM) 301, a picto RAM 302, a character generator ROM (CGROM) 303 and a character color RAM (CCRAM) 304.

The LCD driver 400 includes a gradation PWM (Pulse Width Modulation) signal generator 401, a parallel/serial converter 402, a shift register 403, a common signal generator 404, a common driver 405, a latch circuit 406 and a segment driver 407.

A description will now be given of the power supply section 51.

The constant voltage generator 512 is comprised of a constant voltage source and generates a constant voltage from a supply voltage $V_{DD}$, a ground voltage $V_{SS}$ and a reference voltage $V_{REF}$. The supply voltage adjuster 511 adjusts the value of the constant voltage which is generated by the constant voltage generator 512. The supply voltage booster 513 boosts the constant voltage generated by the constant voltage generator 512. The LCD voltage synthesizer 514 receives the supply voltage boosted by the supply voltage booster 513, combines a plurality of voltages needed to drive the segment electrodes, and supplies the resultant voltage to the segment driver 407.

The output interface circuit 100 converts the serial input data DATA, the serial interface shift clock signal SCK and the serial interface input enable signal STB, supplied from the display controller 10, to levels or data which can be processed in the drive controller 5, and sends the results to the individual sections in the drive controller 5.

The control section 200 will be discussed below. The oscillator 201 generates a reference oscillation signal from the serial interface shift clock signal SCK supplied from the display controller 10. The frequency divider 202 frequency-divides the reference oscillation signal from the oscillator 201 by a predetermined frequency-dividing ratio. The timing synthesizer 203 synthesizes acquires a timing signal to drive the common electrodes from the frequency-divided signal from the frequency divider 202, and supplies the timing signal to the common signal generator 404.

The address counter 204 counts the addresses of data to be displayed, stored in the DDRAM 301 and the picto RAM 302, based on the serial interface shift clock signal SCK supplied from the output interface circuit 100. The address counter 204 sends out the counted addresses to the DDRAM 301 and the picto RAM 302.

The status register group 205 comprises a plurality of registers for temporarily storing character data, color attribute data, display color specifying palette data and the like included in the serial input data DATA input from the output interface circuit 100.

The command decoder 206 decodes a command included in serial input data DATA from the output interface circuit 100 and controls the individual sections according to the decoded result.

The power ON detector/reset circuit 207 detects the power ON action of the color LCD apparatus 1 and resets the individual sections of the drive controller 5.

A description will now be given of the memory section 300.

Figure 6:
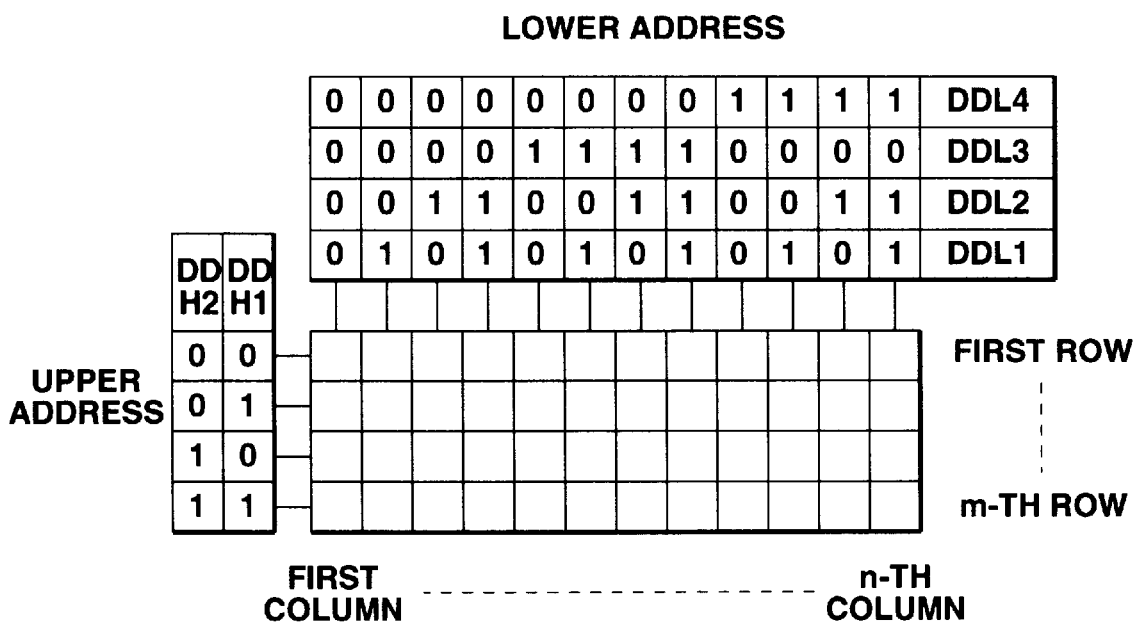
FIG. 6 is a diagram depicting the memory structure of a DDRAM according to this embodiment.

The DDRAM 301 has a plurality of memory areas of 4×12 bits in association of the character display areas 3b of 4 lines by 12 digits, as shown in FIG. 6. Each memory area stores 8-bit character data (code data). The address of each memory area in the DDRAM 301 consists of six bits (upper two bits (DDH1 and DDH2) and lower four bits (DDL1 to DDL4). The memory addresses of the DDRAM 301 correspond to the character display positions of the character display areas 3b in a one-to-one relation. When a character "B" is to be displayed on the character display area 3b at the first line and the second column as shown in FIG. 3, for example, 8-bit character data (code) of the character "B" is stored at the upper address (DDH2, DDH1)=(00) and the lower address (DDL1–DDL4)=(1000) in the DDRAM 301.

The memory contents of the DDRAM 301 can be set and changed arbitrarily by the display controller 10 in accordance with the display contents.

Figure 7:
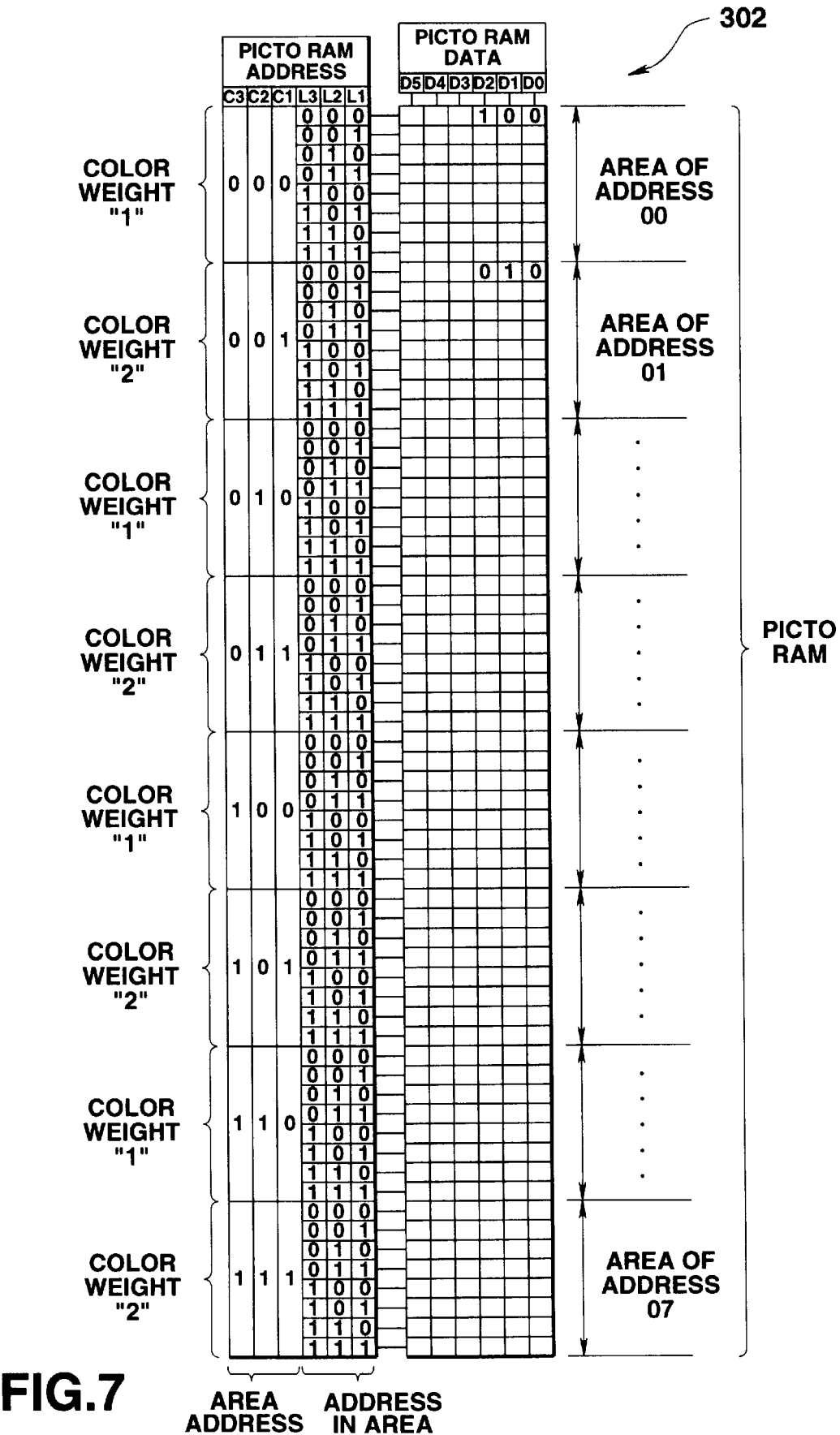
FIG. 7 is a diagram depicting the memory structure of a pictograph (picto) RAM according to this embodiment.

FIG. 7 shows the memory structure of the picto RAM 302.

The picto RAM 302 stores 2-bit data (color attribute data) indicative of a picto display color to be displayed on the picto display area 3c of the LCD panel 3. The picto RAM 302 has eight memory areas of 8×6 bits so that display colors of (8×6)×4 patterns can be specified. It is possible to arbitrarily decide whether or not to actually use those memory areas, in accordance with the structure of the LCD panel 3.

In FIG. 3, for example, there are three segments (patterns) of "Eng.", "Jap." and "frame". Therefore, only color attribute data (six bits) for three segments are stored and the other areas are empty and unconnected in FIG. 7.

Each memory area ((8×6) bits) of the picto RAM 302 is specified by a 3-bit upper address C1-C3 and one word (six bits in this case) in each memory area is specified by a 3-bit lower address L1-L3.

2-bit color attribute data for indicating the color of each segment is stored, separated at the relatively same address positions in two adjoining memory areas of an odd-numbered address and an even-numbered address. Bit data with a weight "1" ($2^0$) is stored in the area at an even-numbered address, and bit data with a weight "2" ($2^1$) is stored in the area at an odd-numbered address.

For example, the color attribute data (00; background color) of the segment of the "frame" in FIG. 3 (first segment) is stored in the 0-th bits D0 at addresses "000000" and "001000" (C3-C1, L3-L1) in the picto RAM 302. Likewise, the color attribute data (10; red) of the segment "Eng." in FIG. 3 is stored in the first bits D1 and the color attribute data (01; blue) of the segment "Jap." is stored in the second bits D1.

The color attribute data of each segment is allowed to be externally supplied by the display controller 10.

Figure 8:
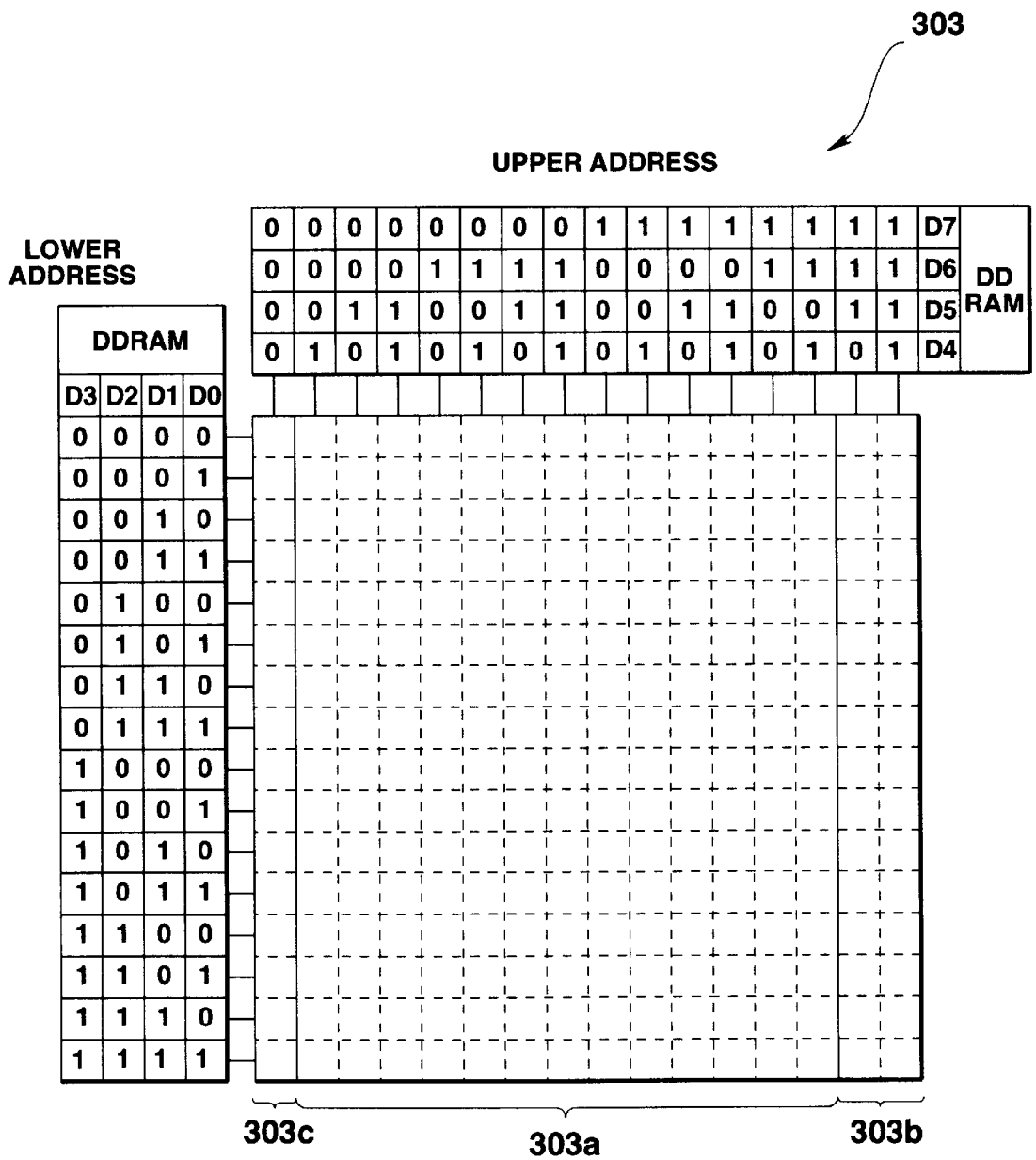
FIG. 8 is a diagram depicting the memory structure of a CGROM according to this embodiment.

FIG. 8 depicts the memory structure of the CGROM 303.

The CGROM 303 serves to store character fonts, and has a memory area (10h to DFh) 303a for storing 208 character fonts having a size of 5×8 bits, a memory area (E0h to FFh) 303b for storing 32 character fonts having a size of 6×8 bits, and a memory area (08h to 0Fh) 303c for storing 8 pictographs of 6×8 bits.

Those memory addresses each consist of eight bits (upper four bits and lower four bits) and are associated with character codes stored in the DDRAM 301. It is to be noted that the address 00h to 07h is what is assigned to the above-described picto RAM 302 and the address 00h to 07h in the CGROM 303 is not used.

From the viewpoint of the hardware structure, the GCROM 303 is comprised of a backed-up RAM or the like, so that the use efficiency of the hardware becomes higher if the address 00h to 07h in the CGROM 303 is used.

Figure 9:
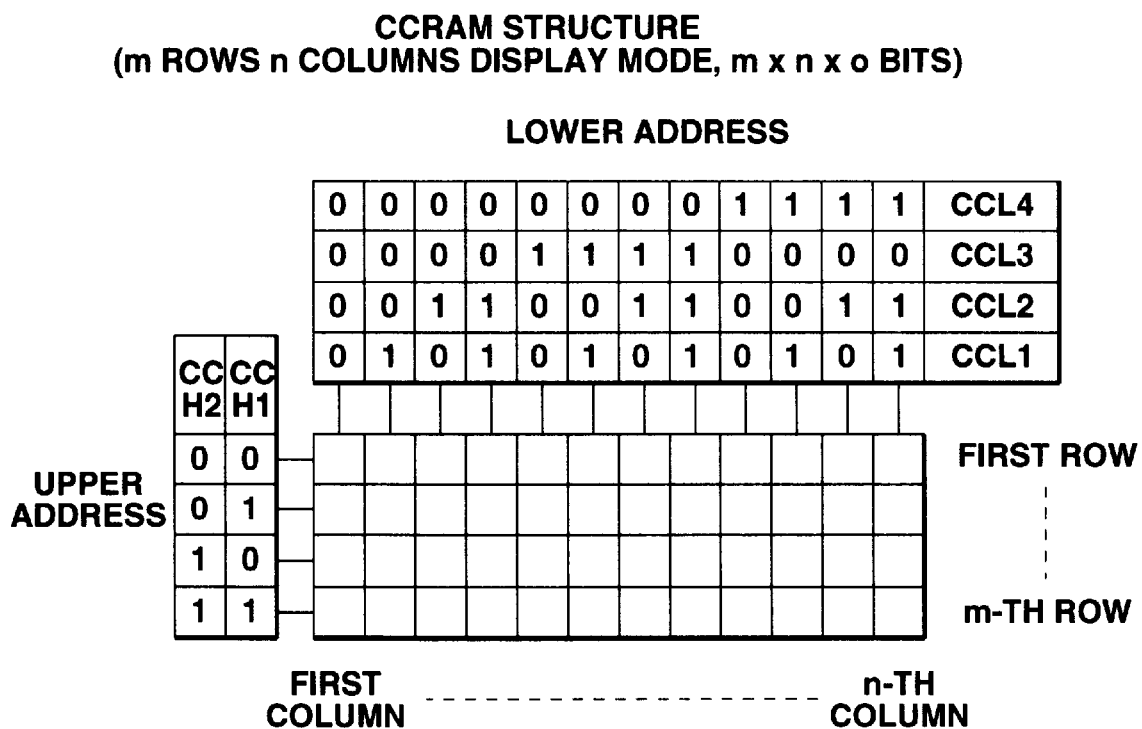
FIG. 9 is a diagram depicting the memory structure of a CCRAM according to this embodiment.

FIG. 9 depicts the memory structure of the CCRAM 304.

The CCRAM 304 serves to specify the display colors of individual characters to be displayed on the character display areas 3b of the LCD panel 3, i.e., the display colors of the character codes stored in the DDRAM 301, and stores color attribute data in association with display data to be stored in the individual memory areas in the DDRAM 301. The CCRAM 304 has 4×12 memory areas in association with the character display areas 3b which display characters of 4 lines by 12 digit. As mentioned earlier, each color attribute data consists of 2 bits and each memory area has a size of 2 bits. Each memory address of the CCRAM 304 consists of six bits (upper two bits (CCH1 and CCH2) and lower four bits (CCL1–CCL4)). The memory addresses of the CCRAM 304 correspond to the character display positions of the character display areas 3b and the memory addresses of the DDRAM 301 in a one-to-one relation.

The 2-bit color attribute data stored in the CCRAM 304 specifies the display color of the character code stored at the same address position in the DDRAM 301.

The contents of the CCRAM 304 are also allowed to be externally set by the display controller 10.

The LCD driver 400 will now be described.

Based on the serial interface shift clock signal SCK, the PWM signal generator 401 generates a gradation setting PWM signal for the PWM driving of the segment electrodes 36 in association with 2-bit color attribute data stored in the CCRAM 304. The PWM signal generated by the PWM signal generator 401 is sent to the segment driver 407.

The above will be discussed more specifically. The PWM signal generator 401 has four palettes A to D each for storing 4-bit data. The palettes A to D respectively correspond to the color attribute data 00 to 11 stored in the CCRAM 304, and store palette data for setting the width of the pulse to be applied to the LCD panel 3 to an arbitrary value in sixteen levels (background color: 0000, red: 0110, blue: 1101 and green: 1111) as shown in FIG. 10, at the time the color attribute data is specified. When palette data is set to 1101, for instance, a pulse whose width is 12/15 of one horizontal scan period, for example, is produced.

Writing of data in the palettes A to D is executed by an instruction command "write palette data." More specifically, of displayable sixteen colors, four which can simultaneously be displayed are selected, are set in the palettes A–D and are selected to be displayed by the color attribute data.

In this embodiment, for example, the background color, red, blue and green are displayed with the color attribute data "00," "01," "10" and "11," respectively. It is further assumed that the LCD panel 3 is driven with a duty ratio of 1/33and a bias of 1/5, the values of the effective voltages to be applied to the segment electrodes 36 for setting those colors are set to 6.73 to 6.82 V for red, 6.86 to 6.94 V for blue, 7.00 to 7.55 V for green and 6.55 V for the background color, and data "0000," "0110," "1011" and "1111" have previously been written in the palettes A to D for controlling the pulse width of the segment signal in order to acquire those effective voltage values.

In setting data (palette data) to the palettes A–D, the display controller 10 supplies the "palette data writing command" and each palette data to the output interface circuit 100. The output interface circuit 100 sets this command in the command decoder 206 and supplies the palette data to the palettes A–D via the status registers 205.

When receiving data from the picto RAM 302, the parallel/serial converter 402 reconstructs color attribute data of each segment, and converts the reconstructed color attribute data to serial data which is in turn sent to the shift register 403.

When receiving a character pattern from the CGROM 303 and color attribute data corresponding to that character pattern from the CCRAM 304, the parallel/serial converter 402 outputs the supplied color attribute data for enabled dots specified by the character pattern, selects the color attribute data of the background color for disabled dots and sends the selected color attribute data to the shift register 403 after conversion to serial data.

The shift register 403 sequentially stores serial data (color attribute data specifying the display colors of the individual pixels) supplied from the parallel/serial converter 402 while shifting the serial data. When one dot line of serial data is stored, for example, the shift register 403 transfers the data in parallel to the latch circuit 406.

The common signal generator 404 sequentially generates common drive signals to drive (scan) the common electrodes 38 of the LCD panel 3, based on the common timing signal coming from the timing synthesizer 203. The common drive signals generated by the common signal generator 404 are sequentially transferred to the common driver 405.

The common driver 405 sequentially drives the common electrodes 38 in response to the common drive signals.

The latch circuit 406 latches segment driving data (color attribute data specifying the display colors of the individual pixels) supplied from the shift register 403 and outputs the data to the segment driver 407.

The segment driver 407 combines the data from the latch circuit 406, the display color setting PWM signal from the gradation PWM signal generator 401 and the segment driving supply voltage from the LCD voltage synthesizer 514 to produce a segment drive signal to sequentially drive the segment electrodes of the LCD panel 3.

A description will now be given of the operation of the color LCD apparatus 1 to display characters in colors.

When a character to be displayed on the associated character display area 3b and the display color are set, the display controller 10 supplies a write command together with the character data (character code data), the display position data and the color attribute data of the target character to the output interface circuit 100.

When receiving those data from the display controller 10, the output interface circuit 100 supplies the character data and color attribute data to the DDRAM 301 and the CCRAM 304 respectively via the status registers 205.

Further, the output interface circuit 100 causes the address counter 204 to generate a 6-bit address corresponding to the display position. In accordance with this address, the memory areas in the DDRAM 301 and the CCRAM 304 which correspond to each display position are addressed.

Moreover, the output interface circuit 100 gives a command "write DDRAM data and CCRAM data" to the command decoder 206.

The command decoder 206 decodes this command and supplies the write control signal to the DDRAM 301 and the CCRAM 304.

As a result, 8-bit character data is stored in the addressed memory area in the DDRAM 301, i.e., the memory area corresponding to the display position, and 2-bit color attribute data is stored in the addressed memory area in the CCRAM 304, i.e., the memory area corresponding to the display position.

The above-described processing is repeated for each display position.

In the case where "2" is displayed in "red" on the character display area 3b at the second line and the fourth digit as shown in FIG. 3, for example, the display controller 10 supplies the display position "the second line and the fourth digit," the character data of "2," the color attribute data specifying "red" and the write command to the output interface circuit 100. The output interface circuit 100 respectively supplies the character data indicating "2" and the color attribute data indicating "red" to the DDRAM 301 and the CCRAM 304 via the status registers 205. Further, the output interface circuit 100 causes the address counter 204 to generate the 6-bit address (010100) corresponding to the display position. In accordance with this address, the memory areas in the DDRAM 301 and the CCRAM 304 which correspond to the position "the second line and the fourth digit" are addressed. Furthermore, the output interface circuit 100 gives the command "write DDRAM data and CCRAM data" to the command decoder 206. The command decoder 206 decodes this command and supplies the write control signal to the DDRAM 301 and the CCRAM 304. As a result, 8-bit character data indicating "2" is stored in the addressed memory area in the DDRAM 301, i.e., the memory area corresponding to the display position, and 2-bit color attribute data indicating "red" is stored in the associated memory area in the CCRAM 304.

By repeating the above processing is repeated as needed, data to be displayed on the character display areas 3b can sequentially be set in the DDRAM 301 and the CCRAM 304.

When only the display color of character data already stored in the DDRAM 301 is to be altered, the display controller 10 may supply the color attribute data and the "CCRAM data writing command" to the output interface circuit 100 to write the color attribute data into the CCRAM 304 without manipulating the DDRAM 301.

When only a display character is to be altered while leaving the display color already stored in the DDRAM 301 unchanged, the display controller 10 may supply the character data and the "DDRAM data writing command" to the output interface circuit 100 to write the color attribute data into the DDRAM 301 without manipulating the CCRAM 304.

In setting the display color of each segment (pattern) of the picto display area 3c, the display controller 10 sets the display colors segment by segment, and supplies the segment numbers, the color attribute data indicating their colors and the "picto RAM 302 writing command" to the output interface circuit 100.

Upon reception of those data, the output interface circuit 100 separates the color attribute data of the individual segments to a lower-bit set and an upper-bit set and sequentially supplies those sets of data to the picto RAM 302.

The output interface circuit 100 causes the address counter 204 to sequentially generates 6-bit addresses of the picto RAM 302.

The output interface circuit 100 supplies the "picto RAM writing command" to the command decoder 206. The command decoder 206 decodes this command and supplies a control signal, such as a write enable signal, to the picto RAM 302.

Consequently, 2-bit color attribute data of the each segment is stored, separated at the relatively same address positions in two adjoining memory areas of an odd-numbered address and an even-numbered address.

In the example shown in FIG. 3, there are three segments (patterns) of "frame", "Eng.", and "Jap.". In displaying those segments in the "background color," "red" and "blue" respectively, the display controller 10 supplies the numbers of the individual patterns, the color attribute data (00, 01, 10) indicating their display colors and the "picto RAM writing command" to the output interface circuit 100.

The output interface circuit 100 sends the "picto RAM writing command" to the command decoder 206. The command decoder 206 decodes this command and supplies the write control signal to the picto RAM 302. The output interface circuit 100 causes the address counter 204 to sequentially generate the addresses "000000" and "001000." Further, the output interface circuit 100 separates the color attribute data to a lower-bit set (001) and an upper-bit set (010) and supplies those sets of data to the picto RAM 302 in synchronism with the addressing. Consequently, the color attribute data "00" specifying the background color is stored in the bits D0 of the addresses "000000" and "001000" in the picto RAM 302, the color attribute data "01" specifying "red" is store in the bits D1, and the color attribute data "10" specifying "blue" is stored in the bits D2.

The address counter 204 may be permitted to sequentially generate addresses so that write data is supplied to the picto RAM 302 at the timing at which the desired address is output.

Figure 11:
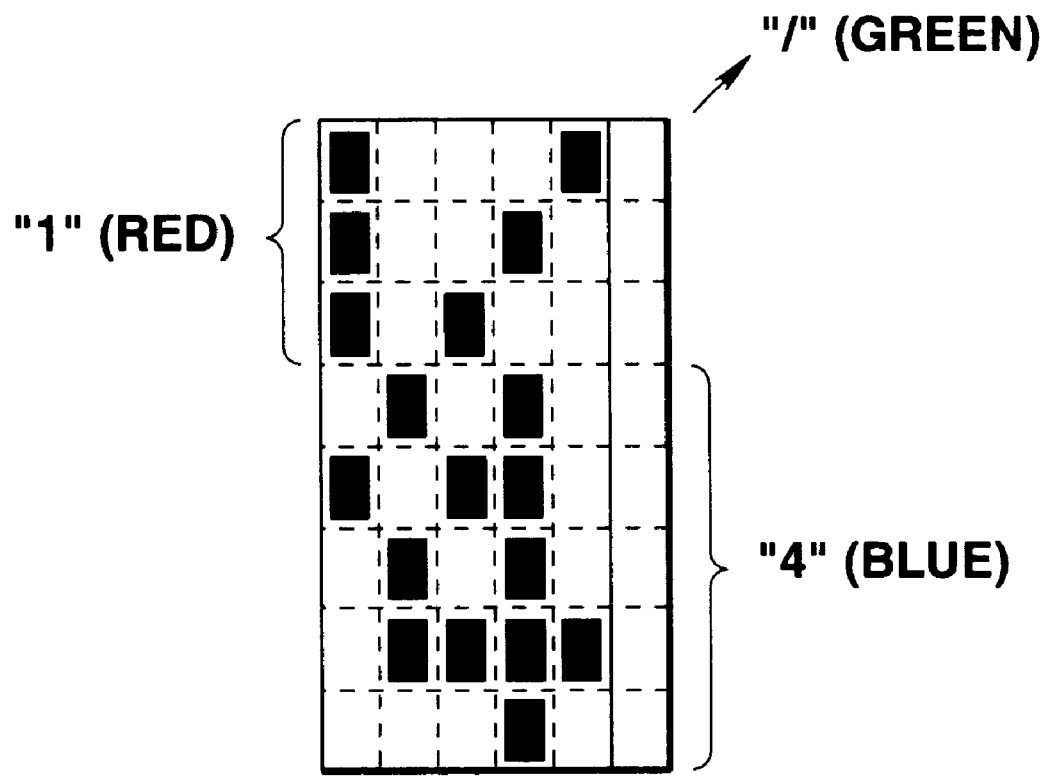
FIG. 11 is a diagram exemplifying picto display data which is displayed in different colors dot by dot.

The command decoder 206 decodes the command and supplies the write control signal to the palettes A–D. As a result, palette data is written in the respective palettes A–D as shown in FIG. 11.

When the character data is written in the DDRAM 301, the color attribute data is written in the picto RAM 302 and the CCRAM 304 and the palette data is written in the palettes A–D in the above manner, preparation for data display is completed.

In displaying an image on the LCD panel 3, the display controller 10 supplies a display command to the output interface circuit 100. In response to this command, the output interface circuit 100 first sets a read command for the picto RAM 201 in the command decoder 206. The command decoder 206 decodes this command and supplies a read control signal to the picto RAM 302. Further, the output interface circuit 100 causes the address counter 204 to sequentially update the address values from "000000."

The picto RAM 302 sequentially reads data from the addresses specified by the address counter 204 and supplies the data to the parallel/serial converter 402. The parallel/serial converter 402 temporarily stores the data read from the picto RAM 302, reconstructs 2-bit color attribute data when data read from adjoining two memory areas are acquired, converts the color attribute data to serial data and supplies the serial data to the shift register 403.

The shift register 403 sequentially stores the serial data input from the parallel/serial converter 402 and transfers the stored data to the latch circuit 406 when, for example, one line (one common electrode) of color attribute data is stored. The end of one line can be determined from the read address in the picto RAM 302 or the like.

The latch circuit 406 sends the latched color attribute data to the segment driver 407.

The segment driver 407 combines the data from the latch circuit 406, the PWM signal from the PWM signal generator 401 and the segment driving supply voltage from the LCD voltage synthesizer 514 to produce a segment drive signal and applies this drive signal to the segment electrodes 36.

As mentioned earlier, the PWM signal is set based on data set in the palettes A–D, and the segment drive signal has a pulse width corresponding to the data set in the palette specified by the color attribute data.

When the color attribute data of the segment "Eng." of the picto display area 3c is set to "01" as shown in FIG. 7, for example, the segment driver 407 produces the segment signal whose pulse width corresponds to the palette data "0110" set in the palette B corresponding to the color attribute data "01" as shown in FIG. 10, and applies this segment signal to the associated segment electrode 36.

Based on the common timing signal supplied from the timing synthesizer 203, the common signal generator 404 sequentially generates the common drive signals to drive the common electrodes 38 of the LCD panel 3. The common drive signals generated by the common signal generator 404 are sequentially transferred to the common driver 405. Based on the common drive signals, the common driver 405 sequentially drives the common electrodes 38 of the LCD panel 3.

When data reading from the picto RAM 302 is completed, the output interface circuit 100 supplies the "DDRAM 301 reading command" to the command decoder 206. The command decoder 206 decodes this command and supplies the read control signal to the DDRAM 301, the CGROM 303 and the CCRAM 304.

The output interface circuit 100 further causes the address counter 204 to generate the 6-bit address corresponding to the display position. According to this address, the memory areas in the DDRAM 301 and the CCRAM 304 which are associated with each display position are addressed.

Consequently, the character data stored in the DDRAM 301 is sequentially read out. The CCROM 303 is addressed with the read character data, so that one line of character pattern data corresponding to the character data is read in the units of six bits, for example, and is supplied to the parallel/serial converter 402.

Likewise, the color attribute data stored in the CCRAM 304 is sequentially read and is supplied together with the associated character pattern data to the parallel/serial converter 402.

In accordance with the supplied character pattern data, the parallel/serial converter 402 selects the 2-bit color attribute data supplied from the CCRAM 304 for enabled dots, selects the color attribute data indicating the background color for disabled dots and sends the selected color attribute data to the shift register 403 after conversion to serial data.

The shift register 403 sequentially stores the color attribute data supplied from the parallel/serial converter 402 and transfers the stored data to the latch circuit 406 when, for example, one line (one common electrode) of color attribute data is stored. The end of one line can be determined from the read address in the DDRAM 301 or the like.

The latch circuit 406 sends the latched color attribute data to the segment driver 407.

The segment driver 407 combines the data from the latch circuit 406, the PWM signal from the PWM signal generator 401 and the segment driving supply voltage from the LCD voltage synthesizer 514 to produce a segment drive signal and applies this drive signal to the segment electrodes 36. At this time, the segment driver 407 reads palette data from one of the palettes A–D using each color attribute data as an address, produces the segment drive signal whose pulse width corresponds to the read data and applies this drive signal to the segment electrodes 36.

As the above-described operation is repeated, the character pattern of arbitrary character data stored in the DDRAM 301 is displayed in the color which is specified by the color attribute data stored in the CCRAM 303. A fixed pattern is displayed on the picto display area 3c in the color specified by the color attribute data stored in the picto RAM 302. What is more, the color specified by the color attribute data can be finely adjusted by the palette data.

In short, this embodiment can display an image on the LCD panel having a plurality of display areas, e.g., the picto display area and the character display area, by specifying display colors in different ways.

This invention is not limited to the above-described embodiment, but may be modified and adapted in various other forms.

Although the foregoing description of this embodiment has been given with reference to the case where character data and color attribute data are supplied to the output interface circuit 100 from the display controller 10, color attribute data may have previously been set in the CCRAM 304 and only a character code may be supplied later. Likewise, character data may have previously been set in the DDRAM 301 and only color attribute data may be supplied later.

The driver can take an arbitrary structure. In this embodiment, when data is displayed on the picto display area 3c, the picto RAM 302 is selectively enabled for data reading, while when For instance, data is displayed on the character display areas 3b, the DDRAM 301 and the CCRAM 304 are selectively enabled for data reading. Instead, different addresses may be assigned to the picto RAM 302, the DDRAM 301 and the CCRAM 304 so that display data is changed according to the difference between the addresses.

For example, each memory area in the picto RAM 302 may be designated with the address "00" to "07" output from the address counter 204, so that color attribute data (one bit in this data) in that area is sequentially read in the units of six bits and each memory area in the DDRAM 301 and the CCRAM 304 is specified with the address at "08" or following it. This structure significantly facilitates the control to enable and disable each memory.

The CGROM 303 may be constituted of a backed-up RAM or the like, so that the area from the address "00" to the address "07" in the CGROM can be used as the picto RAM. In this case, however, character data should take a value equal to or greater than "08."

Although the palettes A–D are provided in the PWM signal generator 304 and the PWM signal indicating the pulse width corresponding to the data set in the palettes A–D is generated in this embodiment, the palettes A–D may be provided in the segment driver 407. In this case, the PWM signal generator 401 generates the PWM signal which specifies sixteen levels of pulse widths. The segment driver 407 selects one of the palettes A–D in accordance with the data (color attribute data) supplied from the latch circuit 406, and generates the segment signal whose pulse width corresponds to the value set in the selected palette, based on the PWM signal.

Although the display patterns of the picto display area 3c are fixed in the above-described embodiment, the number, shapes and the like of the display patterns (segments) of the picto display area 3c may be set arbitrarily. For example, the density of the segments of the picto display area 3c may be set the same as the dot density of the character display area so that a pictograph can be displayed in a dot pattern. In this case, display colors can be designed dot by dot.

FIG. 11 exemplifies a character which is displayed as a pictograph in a dot pattern.

In this example, the elements "1," "/" and "4" in the character "1/4" are displayed in different colors. In this case, bit data of the color attribute data with the weight "1" is set at the address "00"in the picto RAM 302, bit data of the color attribute data with the weight "2" is set at the address "01" and those bits are used as a pair, as shown in FIG. 12.

By displaying a pictograph in such a dot pattern, it is possible to display the elements "1," "/" and "4" in the character "1/4" as gradations (colors) corresponding to the palette data in FIG. 10, namely the element "1" in red, the element "/" in green and the element "4" in blue as shown in FIG. 11.

In the case of displaying the pictographs together with "1/4," the color weight for the addresses "02," "04" and "06" is set to "1," the color weight for the addresses "03," "05" and "07" is set to "2," and those bits are likewise used as a pair.

To increase the number of gradations, the number of addresses to be a set should be increased. (For example, a set of three addresses can provide 8 gradations, and a set of four addresses can provide sixteen gradations.)

As apparent from the above, the display color of a pictograph can be adjusted dot by dot by using the bits at relatively the same positions in adjoining memory areas in the picto RAM 302 as a pair and giving the gradation (color) weights to those bits.

Although the foregoing description of this embodiment has been given with reference to the case where the pulse width modulation (PWM) system for gradation control is used as a method of displaying characters and pictographs in colors, the above-described gradation (color) display of characters and pictographs can also be accomplished by the gradation frame thinning method.

Although the foregoing description of this embodiment has been given with reference to the case where the memory areas with adjoining odd-numbered and even-numbered addresses in the picto RAM 302 are used as a pair, the weight of the color as a pictograph attribute is set by two bits and a character or pictograph is displayed in different colors dot by dot, it is possible to use any other method of setting the weight of the color as a pictograph attribute.

With the memory area structure of the picto RAM 302 having addresses set in the units of 8×6 bits, for example, gradations may be set dot by dot by giving a color weight to adjoining bits (two bits) in each memory area and using those two bits as a pair.

Figure 14:
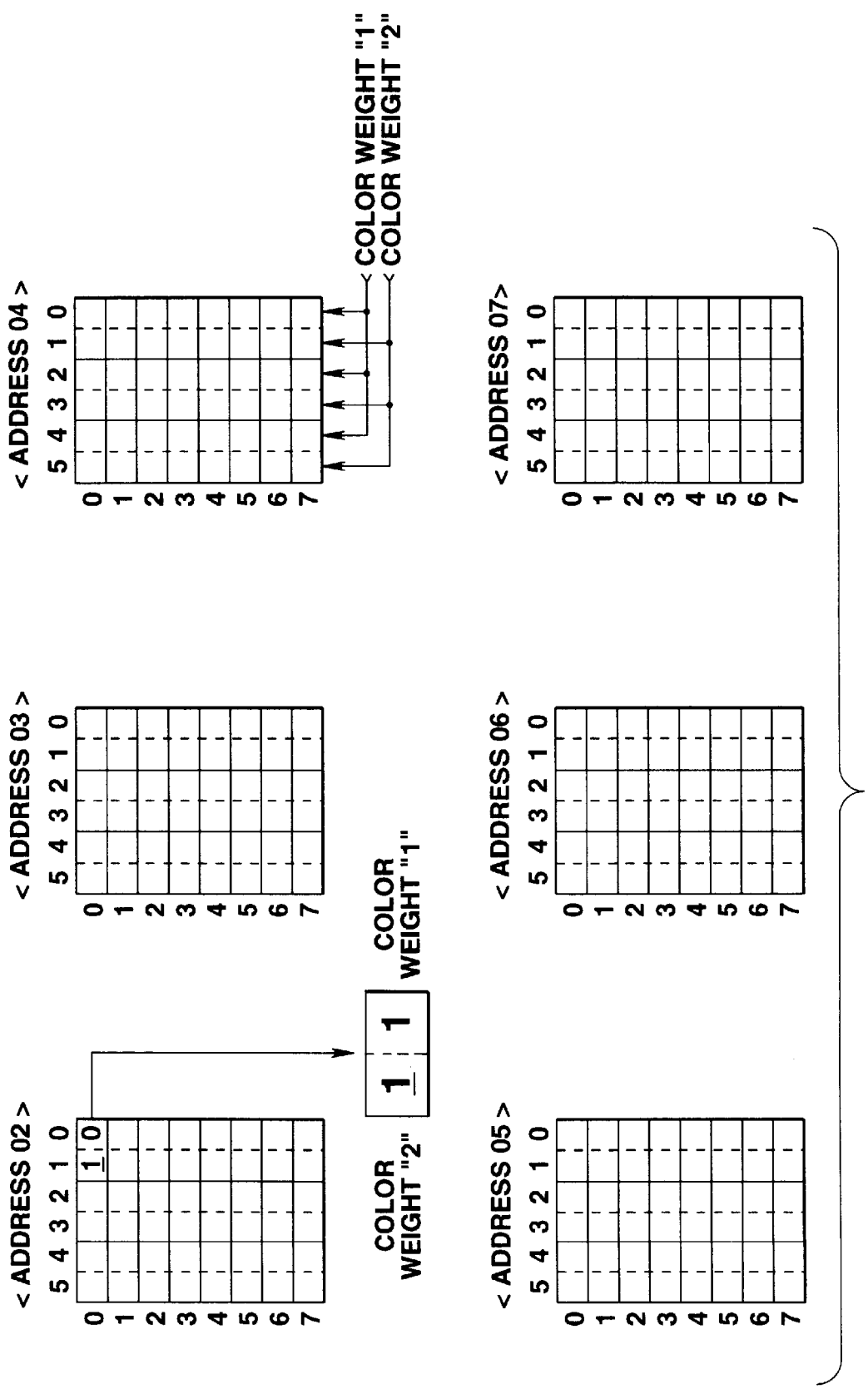
FIG. 14 is a diagram exemplifying the setting of gradation data in the picto RAM by a pair of adjoining bits.

In this case, in the memory area from the addresses"02" to "07" in the picto RAM as shown in FIG. 14, color weights "1" and "2" are alternately set in the column direction as shown in the memory area at the address "04." A gradation like "11 (green)," associated with the palette data shown in FIG. 10, can be set dot by dot by setting the color weight "1" to the right-hand input data "1" in the adjoining pair of bits and setting the color weight "2" to the left-hand input data "1" as shown in the memory area at the address "02."

Therefore, a pictograph can be displayed in colors by giving color weights to the adjoining bits (two bits) in an arbitrary address in the picto RAM and using those bits as a pair. This scheme can allow the color LCD apparatus to accomplish multifarious displays.

Although four gradations are controlled by the adjoining bits (two bits) in an arbitrary address (memory area) in the picto RAM 302, it is possible to display a pictograph in eight gradations using three bits in an arbitrary address or in sixteen gradations using four bits. In this case, however, the number of palette data should be increased.

The gradation setting scheme used to display a pictograph can also be used in registering an arbitrary character as an additional character.

Additional characters may be registered by using the picto RAM as the character generator RAM (CGRAM), for example.

Figure 15:
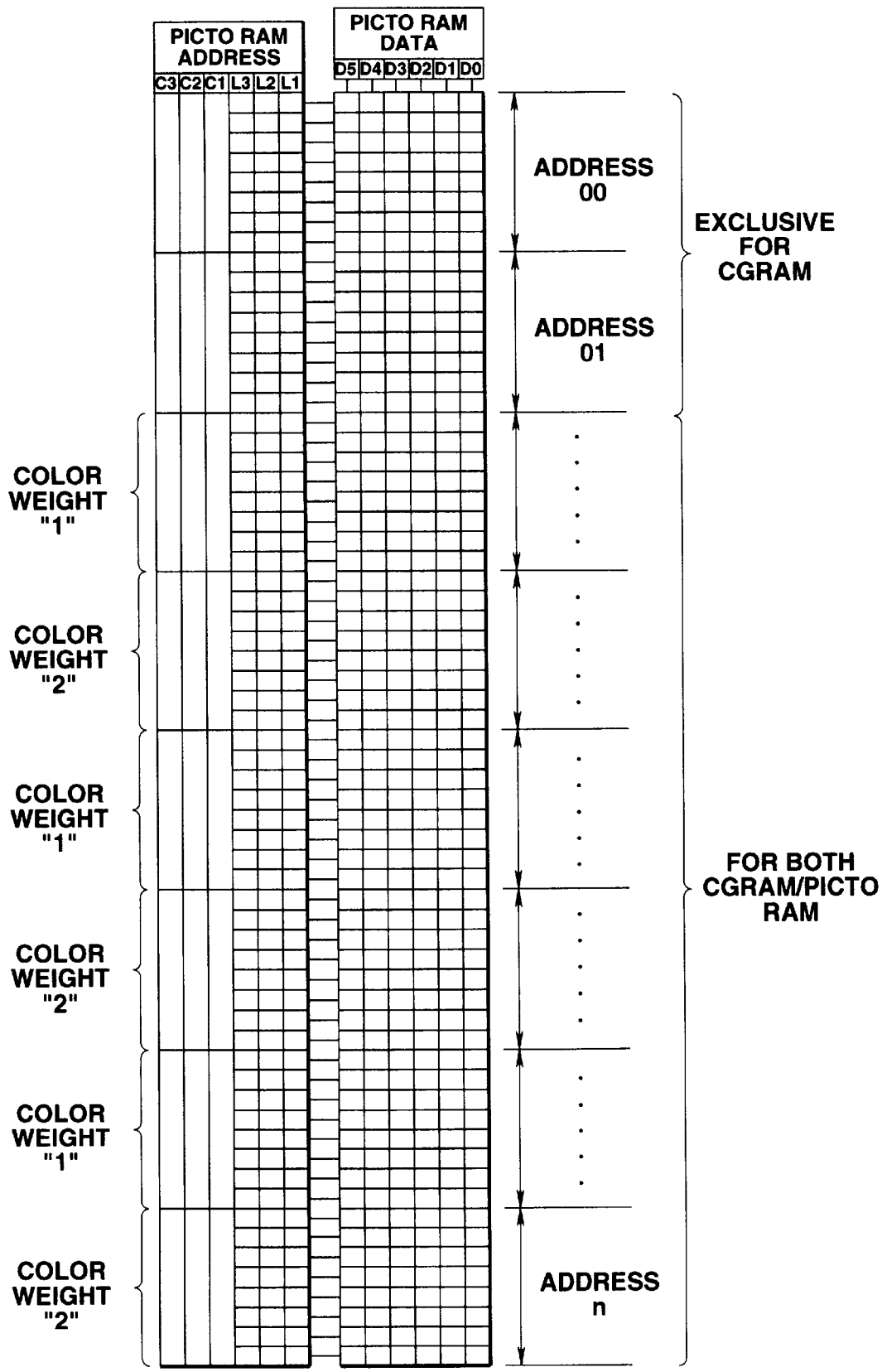
FIG. 15 is a diagram illustrating the memory structure of the picto RAM which also serves as a CGRAM.

FIG. 15 exemplifies the memory structure of the picto RAM which also serves as a CGRAM.

The structure of the picto RAM is substantially the same as that of the picto RAM shown in FIG. 7, with the difference lying in that the addresses "00" and "01" are used exclusively for the CGRAM while the addresses "02" to "07" are used for both the CGRAM and the picto RAM.

In this case, "00h" to "07h" can be used as character codes to be input to the DDRAM 301. In other words, when a character code within this range is to be displayed on the character display areas 3a, data stored in the picto RAM 302 at every adjoining addresses should be used as a pair and should be sent to the shift register 403 from the parallel/serial converter 402 as font data given gradation line by line. The other operation is the same as that for ordinary character font data.

Additional characters may be stored by using any adjoining bits in the picto RAM 302 as a pair.

As discussed above, an additional character can be displayed in different gradations dot by dot, by using the picto RAM as a CGRAM.

Although only one embodiment of the present invention has been described herein, it should be apparent to those skilled in the art that this invention may be embodied in many other specific forms without departing from the spirit or scope of the invention.

What is claimed is:

1. A liquid crystal display apparatus for displaying different colors in accordance with an applied voltage which changes a liquid crystal retardation, said apparatus comprising:
   a first display area, having a plurality of dot-shaped pixels, for displaying a plurality of characters, each of which has a predetermined display color and is represented by a dot-pattern formed by said plurality of pixels;
   a second display area, having a plurality of arbitrarily-shaped pixels each also having a predetermined display color, for displaying an image which is formed by image segments formed by said arbitrarily-shaped pixels; and drive means for specifying display positions, character type and character colors of the respective characters and displaying each of the plurality of characters at a predetermined position with one of the predetermined display colors with respect to the first display area, and for specifying display colors of each of the image segments and displaying the image which is formed by the image segments with respect to the second display area wherein said drive means comprises:

character code storage means, comprising a character code memory having a plurality of memory areas each having an address corresponding to the display position of one of the characters to be displayed on said first display area, with each of the plurality of memory areas having a size corresponding to a number of bits of a character code of one of the characters to be displayed on said first display area, and for storing character codes of the characters to be displayed on the first display area in a memory area having the address of said character code memory in association with the display positions of said characters to be displayed on the first display area;

display color attribute data storage means, comprising a display color data memory, independent from said character code memory, having a plurality of memory areas each having an address corresponding to the display position of each character to be displayed on said first display area, with each of the plurality of memory areas having a size corresponding to a number of bits of display color attribute data of one of the characters to be displayed on the first display area, and for storing the display color attribute data of the characters to be displayed on the first display area in a memory area having an address of said display color data memory corresponding to the display positions of the characters to be displayed on the first display area;

display color designation means for totally designating a display color of the dot-pattern forming a character to be displayed on said first display area in accordance with the stored display color attribute data stored in said display color data memory;

image color attribute data storage means, comprising an image color memory having a number of memory areas which corresponds to a number of bits of image color attribute data of the segments to be displayed on the second display area, with each of the memory areas having a number of memory bits which corresponds to a number of segments forming the image to be displayed on the second display area, and each of the memory bits of each memory area corresponding to each of the segments, and for storing the image color attribute data corresponding to the segments in each memory bit of each of the memory areas; and image color designation means for designating display colors for each of the segments to be displayed on said second display area in accordance with the stored image color attribute data.

2. The liquid crystal display apparatus according to claim 1, wherein said image color attribute data storage means stores each bit of said image color attribute data corresponding to each segment in the memory bits at relatively same positions in adjoining memory areas of said image color memory after dividing each bit of the image color attribute data bit by bit.

3. The liquid crystal display apparatus according to claim 1, wherein each of said display color designation means and said image color designation means comprises palette data selecting means for selecting palette data which designate a pulse width of a drive pulse wave to be applied for displaying colors designated by said display color attribute data and said image color attribute data, respectively, by means of associating said display color attribute data and said image color attribute data with the palette data having a larger number of bits than the number of bits of the display color attribute data and the image color attribute data.

4. A method of driving a liquid crystal display apparatus for displaying different colors in accordance with applied voltages which change a liquid crystal retardation, wherein said liquid crystal display apparatus includes:

a first display area, having a plurality of dot-shaped pixels, for displaying a plurality of characters, each of which has a predetermined display color and is represented by a dot-pattern formed by said plurality of pixels;

a second display areas, having a plurality of arbitrarily-shaped pixels each also having a predetermined display color, for displaying an image which is formed by image segments formed by said arbitrarily-shaped pixels; and drive means for specifying display positions, character type and character colors of the respective characters and displaying each of the plurality of characters at a predetermined position with one of the Predetermined display colors with respect to the first display area, and for specifying display colors of each of the image segments and displaying the image which is formed by the image segments with respect to the second display area; and wherein said method comprises the steps of selecting an address in a character code memory which corresponds to a display position of one of the characters to be displayed on the first display area, with the character code memory having a plurality of memory areas each corresponding to the display positions of the characters to be displayed on the first display area, and each of the memory areas having a size corresponding to a number of bits of a character code of the character to be displayed on the first display area;

storing the character code of the character to be displayed on the first display area at the selected address of the character code memory;

selecting the address of a display color data memory corresponding to the display position of the character to be displayed on the first display area, with the display color data memory having a plurality of memory areas, independent from said character code memory, each having an address corresponding to the display position of the character to be displayed on the first display area, and each of the memory areas corresponding to a number of bits of display color attribute data of the character to be displayed on the first display area;

storing the display color attribute data of the character to be displayed on the first display area at the selected address of the display color data memory;

totally designating a display color of the dot-pattern forming a character to be displayed on said first display area in accordance with the stored display color attribute data;

storing image color attribute data corresponding to each image segment in each memory bit of each memory area included in an image color memory having a plurality of memory areas having a size corresponding to a number of bits of the image color attribute data corresponding to each image segment to be displayed on said second display area, with each of the memory areas having at least a number of memory bits corresponding to a number of image segments forming the image to be displayed on said second display area, and the plurality of memory bits respectively corresponding to the segments; and designating image colors for each image segment to be displayed on said second display area in accordance with the stored image color attribute data.

5. The method according to claim 4, wherein said step of storing image color attribute data comprises a step of storing each bit of said image color attribute data corresponding to each segment in the memory bits at relatively same positions in adjoining memory areas of said image color memory after dividing each bit of said image color attribute data bit by bit.

6. The method according to claim 4, wherein each of said display color designating step and said image color designating step comprises selecting palette data which designate a pulse width of a drive pulse wave to be applied for displaying colors designated by said display color attribute data and said image color attribute data with the palette data, and then setting the pulse width of the drive pulse wave to be applied in accordance with the selected palette data having a larger number of bits than the number of bits of the display color attribute data and the image color attribute data.

* * * * *